(12) United States Patent
Edwards et al.

(10) Patent No.: US 8,667,005 B2
(45) Date of Patent: *Mar. 4, 2014

(54) METHOD AND SYSTEM TO COMBINE KEYWORD AND NATURAL LANGUAGE SEARCH RESULTS

(71) Applicant: AT&T Intellectual Property I, L.P., Atlanta, GA (US)

(72) Inventors: Gregory W. Edwards, Austin, TX (US); Jeffrey Michael Niemeyer, O'Fallon, IL (US); Mary C. Miller, Murphy, TX (US); Yongmei Jia, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,966

(22) Filed: Oct. 23, 2012

(65) Prior Publication Data

US 2013/0073544 A1 Mar. 21, 2013

Related U.S. Application Data

(63) Continuation of application No. 12/636,716, filed on Dec. 12, 2009, now Pat. No. 8,321,446, which is a continuation of application No. 10/975,023, filed on Oct. 27, 2004, now Pat. No. 7,668,889.

(51) Int. Cl.
*G06F 17/30* (2006.01)
(52) U.S. Cl.
CPC .............................. *G06F 17/30017* (2013.01)
USPC ............................ 707/766; 707/793; 707/804

(58) Field of Classification Search
USPC ......... 707/713, 765, 766, 769, 770, 773, 793, 707/796, 731, 804; 704/2–4, 9, 10
See application file for complete search history.

(56) References Cited

U.S. PATENT DOCUMENTS

| | | |
|---|---|---|
| 4,953,204 A | 8/1990 | Cuschleg, Jr. et al. |
| 4,967,405 A | 10/1990 | Upp et al. |
| 5,335,269 A | 8/1994 | Steinlicht |
| 5,455,903 A | 10/1995 | Jollisant et al. |
| 5,497,373 A | 3/1996 | Hulen et al. |
| 5,522,046 A | 5/1996 | McMillen et al. |
| 5,530,744 A | 6/1996 | Charalambous et al. |
| 5,555,299 A | 9/1996 | Maloney et al. |
| 5,590,186 A | 12/1996 | Liao et al. |
| 5,652,789 A | 7/1997 | Miner et al. |
| 5,754,639 A | 5/1998 | Flockhart et al. |
| 5,754,978 A | 5/1998 | Perez-Mendoza et al. |
| 5,867,817 A | 2/1999 | Catallo et al. |
| 5,923,745 A | 7/1999 | Hurd |
| 5,937,051 A | 8/1999 | Hurd et al. |

(Continued)

OTHER PUBLICATIONS

Crowston et al., The effects of linking on genres of Web documents, 1999, IEEE, 11 Pages.*

*Primary Examiner* — Jean B Fleurantin
(74) *Attorney, Agent, or Firm* — Toler Law Group, PC

(57) ABSTRACT

A search query is received from a single input field of a user interface. A keyword search is performed based on the search query to generate keyword search results. A natural language search is performed of a frequently-asked question (FAQ) database based on the search query to generate FAQ search results. The keyword search results and the FAQ search results are combined in a display page.

20 Claims, 7 Drawing Sheets

(56) References Cited

U.S. PATENT DOCUMENTS

| | | | |
|---|---|---|---|
| 5,940,476 A | 8/1999 | Morganstein et al. | |
| 5,946,388 A | 8/1999 | Walker et al. | |
| 5,953,704 A | 9/1999 | McIllroy et al. | |
| 5,991,756 A | 11/1999 | Wu | |
| 5,995,979 A | 11/1999 | Cochran | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,028,601 A * | 2/2000 | Machiraju et al. | 715/705 |
| 6,049,594 A | 4/2000 | Furman et al. | |
| 6,118,866 A | 9/2000 | Shtivelman | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,496,567 B1 | 12/2002 | Bjornberg et al. | |
| 6,510,414 B1 | 1/2003 | Chaves | |
| 6,519,562 B1 | 2/2003 | Phillips et al. | |
| 6,529,871 B1 | 3/2003 | Kanesky et al. | |
| 6,553,113 B1 | 4/2003 | Dhir et al. | |
| 6,570,967 B2 | 5/2003 | Katz | |
| 6,571,240 B1 * | 5/2003 | Ho et al. | 1/1 |
| 6,584,180 B2 | 6/2003 | Nemoto | |
| 6,587,556 B1 | 7/2003 | Judkins et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliot et al. | |
| 6,615,248 B1 | 9/2003 | Smith | |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arsian et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,082 B1 | 5/2004 | Dong et al. | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,963,983 B2 | 11/2005 | Munson et al. | |
| 7,003,079 B1 | 2/2006 | McCarthy et al. | |
| 7,006,605 B1 | 2/2006 | Morganstein et al. | |
| 7,027,975 B1 | 4/2006 | Pazandak | |
| 7,031,444 B2 | 4/2006 | Shen et al. | |
| 7,035,388 B2 | 4/2006 | Kurosaki et al. | |
| 7,062,505 B2 | 6/2006 | Lane | |
| 7,092,901 B2 | 8/2006 | Davis et al. | |
| 7,142,652 B2 | 11/2006 | Ho et al. | |
| 7,197,130 B2 | 3/2007 | Paden et al. | |
| 7,200,614 B2 | 4/2007 | Raid | |
| 7,287,214 B1 * | 10/2007 | Jenkins et al. | 715/205 |
| 7,356,475 B2 | 4/2008 | Novack et al. | |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032211 A1 | 10/2001 | Kuzumaki | |
| 2001/0032229 A1 | 10/2001 | Hulls et al. | |
| 2001/0034662 A1 | 10/2001 | Morris | |
| 2002/0032675 A1 | 3/2002 | Williamowski et al. | |
| 2002/0046030 A1 | 4/2002 | Haritsa et al. | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzedine et al. | |
| 2002/0196277 A1 | 12/2002 | Bushey et al. | |
| 2003/0018659 A1 | 1/2003 | Fuks et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2003/0235287 A1 | 12/2003 | Margolis | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0083206 A1 | 4/2004 | Wu et al. | |
| 2004/0083479 A1 | 4/2004 | Bondarenko et al. | |
| 2004/0088285 A1 | 5/2004 | Martin et al. | |

(56) References Cited

U.S. PATENT DOCUMENTS

| | | |
|---|---|---|
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075984 A1 | 4/2005 | Bourrieres et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131708 A1 | 6/2005 | De Palma et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub et al. |
| 2006/0018443 A1 | 1/2006 | Knott |
| 2006/0023863 A1 | 2/2006 | Joseph |
| 2006/0026049 A1 | 2/2006 | Joseph |
| 2006/0036437 A1 | 2/2006 | Bushey |
| 2006/0039547 A1 | 2/2006 | Klein |
| 2006/0050865 A1 | 3/2006 | Kortum |
| 2006/0056406 A1 | 3/2006 | Bouchare |
| 2006/0062375 A1 | 3/2006 | Pasquale |
| 2006/0093097 A1 | 5/2006 | Chang |
| 2006/0109974 A1 | 5/2006 | Paden |
| 2006/0115070 A1 | 6/2006 | Bushey |
| 2006/0126808 A1 | 6/2006 | Dallesardo |
| 2006/0126811 A1 | 6/2006 | Bushey |
| 2006/0133587 A1 | 6/2006 | Bushey |
| 2006/0153345 A1 | 7/2006 | Bushey |
| 2006/0159240 A1 | 7/2006 | Bushey |
| 2006/0161431 A1 | 7/2006 | Bushey |
| 2006/0177040 A1 | 8/2006 | Mitra et al. |
| 2006/0188087 A1 | 8/2006 | Kortum |
| 2006/0198505 A1 | 9/2006 | Kortum |
| 2006/0215831 A1 | 9/2006 | Knott |
| 2006/0215833 A1 | 9/2006 | Mahoney |
| 2006/0256932 A1 | 11/2006 | Bushey |
| 2006/0291642 A1 | 12/2006 | Bushey et al. |
| 2007/0019800 A1 | 1/2007 | Bushey |
| 2007/0025528 A1 | 2/2007 | Knott |
| 2007/0041551 A1 | 2/2007 | Whitecotton et al. |
| 2007/0047718 A1 | 3/2007 | Idler |
| 2007/0047720 A1 | 3/2007 | Brandt et al. |
| 2007/0116230 A1 | 5/2007 | Brandt et al. |

\* cited by examiner

| SBC | Home | | |
|---|---|---|---|
| | Banner | | |
| SBC Home<br>Residential Customers<br>Business Customers<br>Corporate Information<br>Investor Relations<br>News Room<br>Customer Help/Support<br>Contact Us<br><br>Search or Ask a Question | Residential Customers<br><br>Local, long distance, wireless and internet access products for your home<br><br>All Distance Connections<br><br>Talk all you like from home from under $50 a month.<br><br>News<br><br>SBC Communications to Webcast Presentation At UBS Conference Nov 18<br>... | Business Customers<br><br>Voice, data and network solutions that meet the unique needs of your business<br><br>SBC Yahoo! DSL for Business for $26.95 (online offer)<br><br>Check Availability<br><br>Ex 214-555-1234<br><br>Corporate Information<br>Investor Relations<br>... | Registered User<br>My Account<br>Sign Up Now<br><br>Enter an Offer Code<br><br>Help<br><br>About My Bill<br>View and pay bill online<br>Billing Options<br><br>Solve a Phone Problem<br>How to use my service<br>Troubleshoot a problem<br>Report/Check a problem<br>... |

Search or Ask a Question

82

SBC

SBC Home
Residential Customers
Business Customers
Corporate Information
Investor Relations
News Room
Customer Help/Support
Contact Us Search or Ask a Question

---

Search or Ask a Question
[long distance ▲]

View Top Questions For:
[All Categories ▲▼] — 92

Refine Search | Tips

Search Results for: Long Distance      Results 1-10 of 45

View Results for [Products and Services ▼]

Product and Services Results

1. SBC – Compare our long distance calling plans....

2. SBC – SBC Long Distance Calling Card Charges....

3. SBC – SBC Long Distance International Dialing Guide....

...

Results Pages
[1] 2 3 4 5 Next>

Related Frequently Asked Questions:

1. What long distance plans do you offer residential customers?

2. What International long distance plans do you offer?

3. What Long Distance calling plans save me money?

| SBC | Search |
|---|---|
| SBC Home<br>Residential Customers<br>Business Customers<br>Corporate Information<br>Contact Us<br><br>Search | Search                                   Texas <u>Select a Different State</u><br>[call forwarding]<br>Search | Refine Search | Search Tips<br>Results of search for: call forwarding                    Results 1 -7 of 7<br>Did you mean: <u>transfer calls</u><br>Results for: [Help and Customer Support ▶] — 98<br><br>Help and Customer Support                             Results Pages<br>1. SBC – User Guides – Texas….                                 [1]<br>2. SBC Call Us….<br>3. SBC – Repair….<br>…<br>Results 1 -3 of 3                                                        Results Pages<br>                                                                                   [1] |

METHOD AND SYSTEM TO COMBINE KEYWORD AND NATURAL LANGUAGE SEARCH RESULTS

CLAIM OF PRIORITY

The present application claims priority from and is a continuation of U.S. patent application Ser. No. 12/636,716, filed on Dec. 12, 2009 and titled "METHOD AND SYSTEM TO COMBINE KEYWORD RESULTS AND NATURAL LANGUAGE SEARCH RESULTS," which claims priority from and is a continuation of U.S. patent application Ser. No. 10/975,023, filed on Oct. 27, 2004, now issued as U.S. Pat. No. 7,668,889, and titled "METHOD AND SYSTEM TO COMBINE KEYWORD AND NATURAL LANGUAGE SEARCH RESULTS," the contents of each of which are expressly incorporated herein by reference in their entirety.

BACKGROUND

A challenge for a developer of a Web site is predicting what users will want to do on the Web site and whether all users will understand the names of the links provided on the Web site. Since some users prefer to navigate a Web site by typing what they are looking for, many Web sites provide a search engine to allow users to find what they are looking for using their own terminology. Allowing users to find what they are looking for quickly and easily often translates into increased sales and/or reduced support costs.

The development of natural language search algorithms has made use of natural language searching of Web sites more feasible and popular. A natural language search engine receives full sentences (which may be in English or another language) as typed or otherwise entered by users, and searches a set of data based on both the words in the sentence and the construction of the sentence. Natural language search engines are often used to retrieve answers to frequently asked questions (FAQs) by searching a FAQ database including a number of questions and answers.

Keyword search engines are also provided by many Web sites. A keyword search engine searches an entire Web site for pages and other resources related to user-entered keywords.

When both a natural-language FAQ search feature and a keyword search feature are provided by a Web site, the user may become confused as to which search engine to use. Further, the placement and naming of the two search features can become problematic for a developer of the Web site.

Further, search results are generally presented in a linear list with multiple types of results being intermixed. Some of the search results may have little bearing on the user's intended search. For example, a user searching on "DSL" may be presented search results related to sales of DSL, technical aspects of DSL, technical support for DSL and other DSL-related results, all mixed together without preference given to the user's area of focus. Recent research has pointed to the use of categorization of search results as a method to allow users to more quickly and easily find the results they are looking for.

BRIEF DESCRIPTION OF THE DRAWINGS

The present invention is pointed out with particularity in the appended claims. However, other features are described in the following detailed description in conjunction with the accompanying drawings in which:

FIG. 3 is a screen shot of an embodiment of the user interface in FIG. 2;

FIG. 4 is a screen shot of an embodiment of the first display page in FIG. 2;

FIG. 5 is a screen shot of an embodiment of the second display page in FIG. 2;

FIG. 6 is a screen shot of an embodiment of the first display page in FIG. 2 that includes keyword search results but not FAQ search results; and FIG. 7 is a screen shot of an example of a detailed search results page that includes a drop-down menu for modifying a category.

DETAILED DESCRIPTION

Tests have shown that about half of sampled users prefer keyword searches, and about another half prefer natural language searches in some applications. To satisfy all users, embodiments of the present disclosure perform both types of searches based on a search query entered into a single input field, and combine the two resulting types of search results into a single display page.

To assist users in focusing on particular areas of interest in the search results, the display page categorizes the keyword search results and the FAQ search results into a plurality of categories. The types and number of categories are determined using a card sort technique. In the above-described DSL example, the display page may categorize the DSL search results into products and services category, a billing and account category, a help and support category, and a corporate information category. The user can view and directly expand on the help and support category, for example, from the display page to retrieve the information he/she is looking for.

Figure 1:
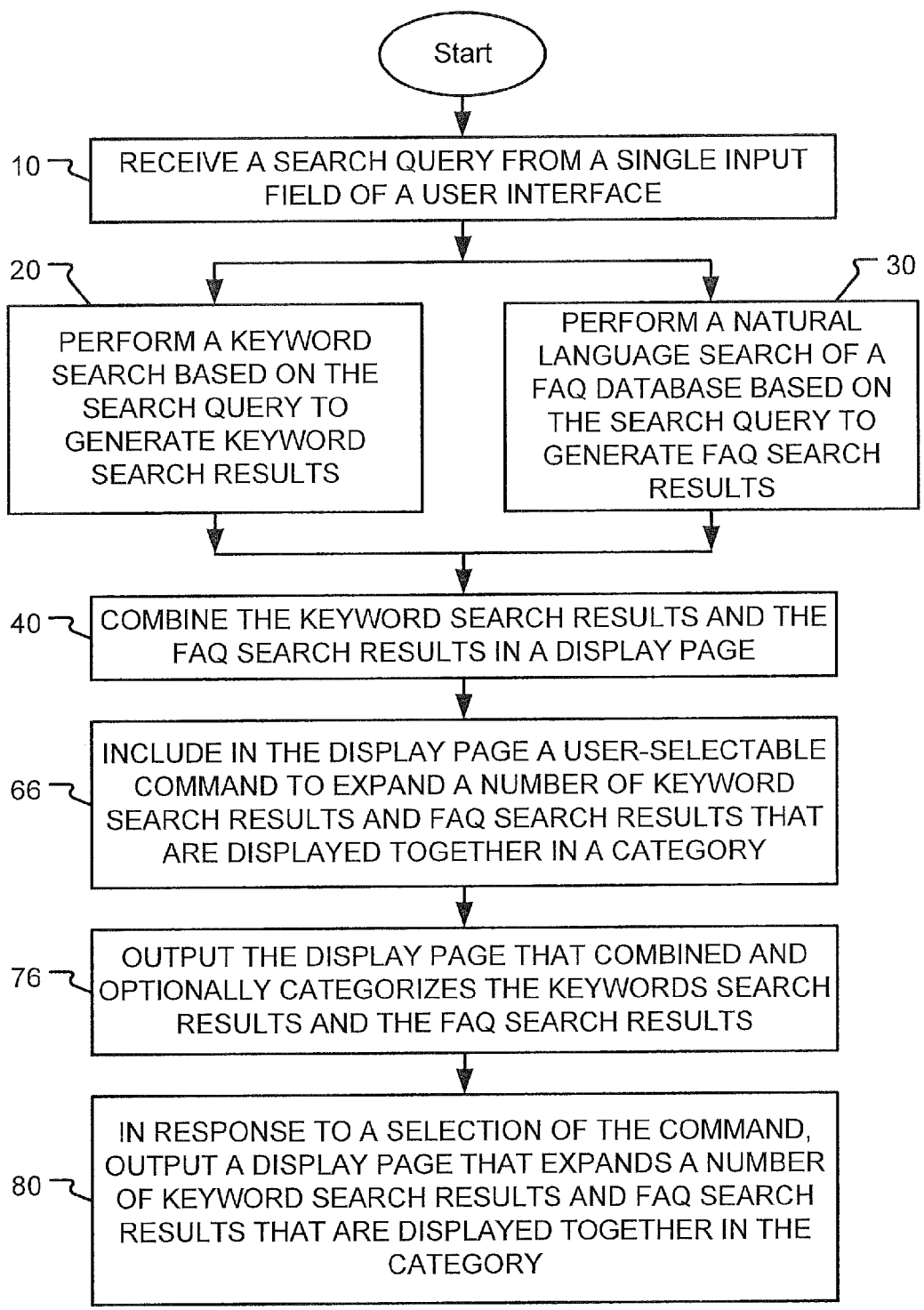
FIG. 1 is a flow chart of an embodiment of a method of providing combined search results.

Embodiments of the present disclosure are described with reference to FIG. 1, which is a flow chart of an embodiment of a method of providing combined search results, and FIG. 2, which is a block diagram of an embodiment of a system to provide combined search results.

As indicated by block 10, the method comprises receiving a search query 12 from a single input field 14 of a user interface 16. The user interface 16 may be provided by a search service that provides search results for multiple Web sites or by a page of a Web site that provides search results for other pages of the Web site. The user interface 16 may accompany the single input field with a textual display to clearly indicate to users that they may enter search queries that comprise either keyword(s) or a full question. In one embodiment, the textual display accompanying the single input field comprises "search or ask a question".

As indicated by block 20, the method comprises performing a keyword search based on the search query 12 to generate keyword search results 22. The keyword search is performed by a keyword search engine 24. The keyword search engine 24 performs the keyword search of contents of one or more Web sites 26. If the user interface 16 is provided by a general purpose search service, the contents of one or more Web sites 26 comprise contents from multiple Web sites that have been indexed by the search service. If the user interface 16 is provided by a Web page to enable users to search within a single Web site, the contents of one or more Web sites 26 may comprise content only from multiple pages of the same Web site.

As indicated by block 30, the method comprises performing a natural language search based on the search query 12 to generate search results 32. The natural language search is performed by a natural language search engine 34. The natural language search engine 34 performs the natural language search of contents of a frequently-asked questions (FAQ) database 36. If the user interface 16 is provided by a Web page to enable users to search within a single Web site, the FAQ database 36 may comprise questions and associated answers that are frequently asked or anticipated to be asked by users of the Web site.

As indicated by block 40, the method comprises combining the keyword search results 22 and the FAQ search results 32 in a display page 44.

In one embodiment, the display page 44 is divided into two columns: a first column to contain some or all of the keyword search results 22 but none of the FAQ search results 32, and a second column to contain some or all of the FAQ search results 32 but none of the keyword search results 22.

Optionally, the display page 44 categorizes the keyword search results 22 and the FAQ search results into a plurality of categories. For purposes of illustration and example, the display page 44 is shown to have three different categories A, B and C, although any number of categories may be used. In this example, the keyword search results 22 are divided into keyword search results 50 in category A, keyword search results 52 in category B, and keyword search results 54 in category C. Similarly, the FAQ search results 32 are divided into FAQ search results 60 in category A, FAQ search results 62 in category B, and FAQ search results 64 in category C.

The particular categories A, B and C are application-dependent. In some applications, the categories may include products and services category, a billing and account category, a help and support category, and a corporate information category. These categories may be of particular interest when the user interface 16 is part of a telecommunication service provider's Web site.

The categories may be determined using a card sort method prior to receiving the search query 12. The card sort method comprises creating a representative sample of some or all of the Web site content on cue cards. The cue cards may be either physical cards or virtual cards displayed using a computer. A first sample of individuals organize the cue cards into groups and name the groups in a manner that makes sense to them. The individuals may perform these acts either individually or collectively. If performed individually, a statistical cluster analysis is performed to determine an optimal set of groupings that accommodates as many of the individuals' groupings as possible. The naming of the groups in the optimal set are based on the names provided by the first sample of individuals. The naming and nature of the groupings are validated using a reverse card sort. The reverse card sort comprises having a second sample of individuals, different from the individuals in the first sample, sort the cue cards into the defined groups. Unlike existing search engines that use company created categories, the card sort method generates search categories that match users' mental models.

In general, the layout of the search results on the display page may be determined by performing one or more usability tests prior to receiving the search query 12. Based on the results of a usability test for a layout, a modified layout may be determined and subjected to a subsequent usability test. This process may be repeated until a desirable layout is achieved.

In one embodiment of the layout, the display page 44 is divided into rows, where each row is dedicated to display keyword search results and FAQ search results for an associated one of the categories. For example, the keyword search results 50 in category A and the FAQ search results 60 in category A are displayed in a first row dedicated to category A. The keyword search results 52 in category B and the FAQ search results 62 in category B are displayed in a second row dedicated to category B. The keyword search results 54 in category C and the FAQ search results 64 in category C are displayed in a third row dedicated to category C.

The display page 44 may display all of the keyword search results and/or FAQ search results in a particular category, or may display only a subset of the keyword search results and/or FAQ search results in a particular category. In one embodiment, at most three keyword search results and at most three FAQ search results are displayed in each particular category. In this embodiment, the top one, two or three keyword search results and the top one, two or three FAQ search results (based on the search query 12) may be displayed in each particular category.

Presenting the top three results for each category directly on the first display page 44 promotes user understanding of the nature of each category based on both the displayed name of the category and the search results in the category. Further, the user is allowed to find links to the particular result(s) of interest to him/her directly from the first display page 44. These features distinguish from existing search engines that show only company-created category names on the front page that require users to guess the meaning of each category and to go to a subsequent page to see the results of a category.

The order of the categories in the display page 44 may be either fixed or variable. Optionally, the order of the categories varies based on how well the results in each category match the search query 12. In one embodiment, the category whose results best match the search query 12 is displayed in the first row, followed in the second row by the category whose results have the second best match with the search query 12, and so on. For example, if the search query 12 is "slow DSL", the "help and support" category may be presented first in a list of categories because the best matches for "slow DSL" are within the "help and support" category. When viewed from top to bottom, the display page 44 displays categories with decreasingly better matches in this embodiment.

Optionally, the display page 44 also includes the user interface 16 so that the user can refine his/her search or enter a different search query.

As indicated by block 66, the method optionally comprises including in the display page 44 a user-selectable command to expand a number of keyword search results and/or FAQ search results that are displayed together in a category. In the example of FIG. 2, the display page 44 may further comprise user-selectable commands 70, 72 and 74 to expand a number of keyword search results and FAQ search results that are displayed together in categories A, B or C, respectively.

As indicated by block 76, the method comprises outputting a signal to display the display page 44 to the user who entered the search query 12. The display page 44 may be encoded in a markup language such as Hypertext Markup Language (HTML) or an alternative type of computer code.

As indicated by block 80, the method optionally comprises outputting another display page 82 that expands a number of keyword search results and FAQ search results that are displayed together in a category in response to a user selection of one of the commands 70, 72 or 74. For purposes of illustration and example, consider the user selecting the command 74. In response thereto, expanded keyword search results 84 in category C and expanded FAQ search results 86 in category C are displayed in the display page 82. In one embodiment, the display page 82 includes ten keyword search results and ten FAQ search results from the user-selected category.

Optionally, each of the display pages 44 and 82 includes a header 90 and 92, respectively, having a user-selectable option to view questions in a user-selected one of the categories. The questions may comprise the most frequently asked and/or most relevant questions from the FAQ database 36 that are in the user-selected category. The header 90 and 92 provides an alternative for browsing the questions and answers in the FAQ database 36 if, for example, the user is having difficulty with the search or wants to see what other related information is in the FAQ database 36.

Optionally, the display page 82 also includes a user-selectable drop-down menu (such as a drop-down box, for example) with the other categories so that users may view and expand the view of their search results in another category without having to return to the display page 44 and select another option (such as the command 70 or the command 72, for example).

Optionally, the display page 82 also includes the user interface 16 so that the user can refine his/her search or enter a different search query.

The herein-disclosed system can be embodied by a computer system comprising one or more computers. The acts performed by each of the herein-disclosed components can be directed by respective computer program code embodied in a computer-readable form on a computer-readable medium. Each of the herein-disclosed components may comprise a respective computer processor responsive to the computer program code to perform the acts.

Figure 2:
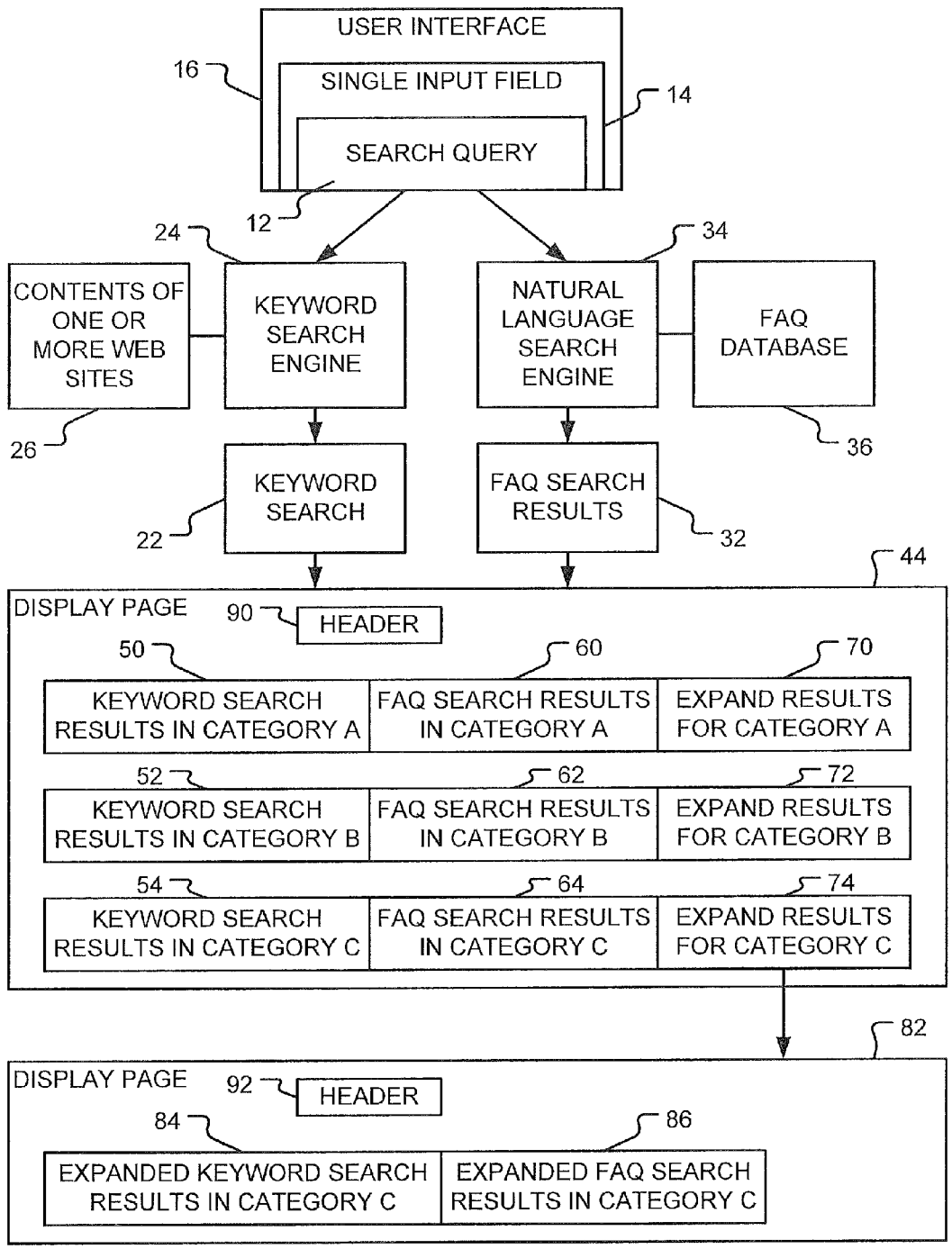
FIG. 2 is a block diagram of an embodiment of a system for providing combined search results.

FIG. 3 is a screen shot of a user interface 16' that is an embodiment of the user interface 16 in FIG. 2. The user interface 16' has a single entry field 14' accompanied by an instruction to the user to "search or ask a question". Based on the instruction, users clearly recognize that they may use the single entry field 14' to type either one or more keywords or a full question, thus eliminating a need for users to choose which search tool to use. For purposes of illustration and example, consider a user entering a search query of "long distance" into the single entry field 14'. The keyword search engine 24 searches the contents of a telecommunication service provider's Web site to find Web pages related to "long distance". The natural language search engine 34 searches the FAQ database 36 to find questions and/or answers related to "long distance".

Figure 4:
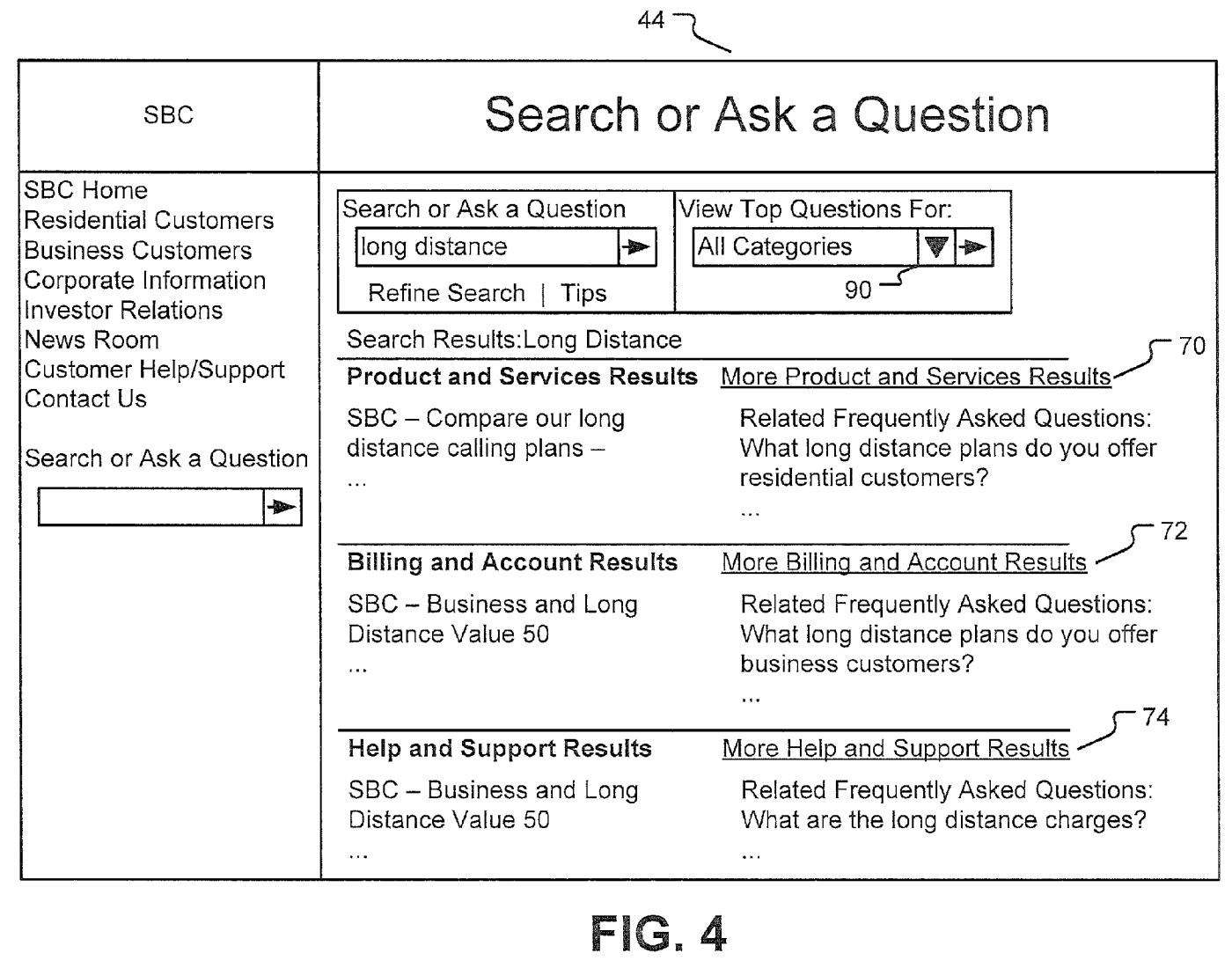

FIG. 4 is a screen shot of a display page 44' that is an embodiment of the display page 44 in FIG. 2. The display page 44' is a search results page that combines keyword search results (e.g. the Web pages related to "long distance" in the telecommunication service provider's Web site) and FAQ search results (e.g. questions and/or answers from the FAQ database 36 that are related to "long distance"). Presenting both sets of results on the first page increases the likelihood that the user will find what he/she is looking for without having to navigate to other pages of search results, and reduces a number of pages to be maintained by developers.

The display page 44' is divided into rows and columns to distinguish between different categories of search results (e.g. products and services, billing and account, and help and support) and different types of search results (e.g. keyword and FAQ results), respectively. Hyperlinks 70', 72' and 74' are embodiments of the commands 70, 72 and 74, respectively, to expand the search results in a respective category. For purposes of illustration and example, consider the user clicking on or otherwise selecting the hyperlink 70' for more products and services results.

FIG. 5 is a screen shot of a display page 82' that is an embodiment of the display page 82 in FIG. 2. The display page 82' is displayed to the user in response to the selection of the hyperlink 70'. The display page 82' lists an expanded number of keyword search results and an expanded number of FAQ search results in the products and services category for the search query of "long distance".

With reference to FIGS. 4 and 5, the display pages 44' and 82' include headers 90' and 92', respectively, to view top questions for all categories, or for a particular category selected using a drop-down box.

Figure 6:
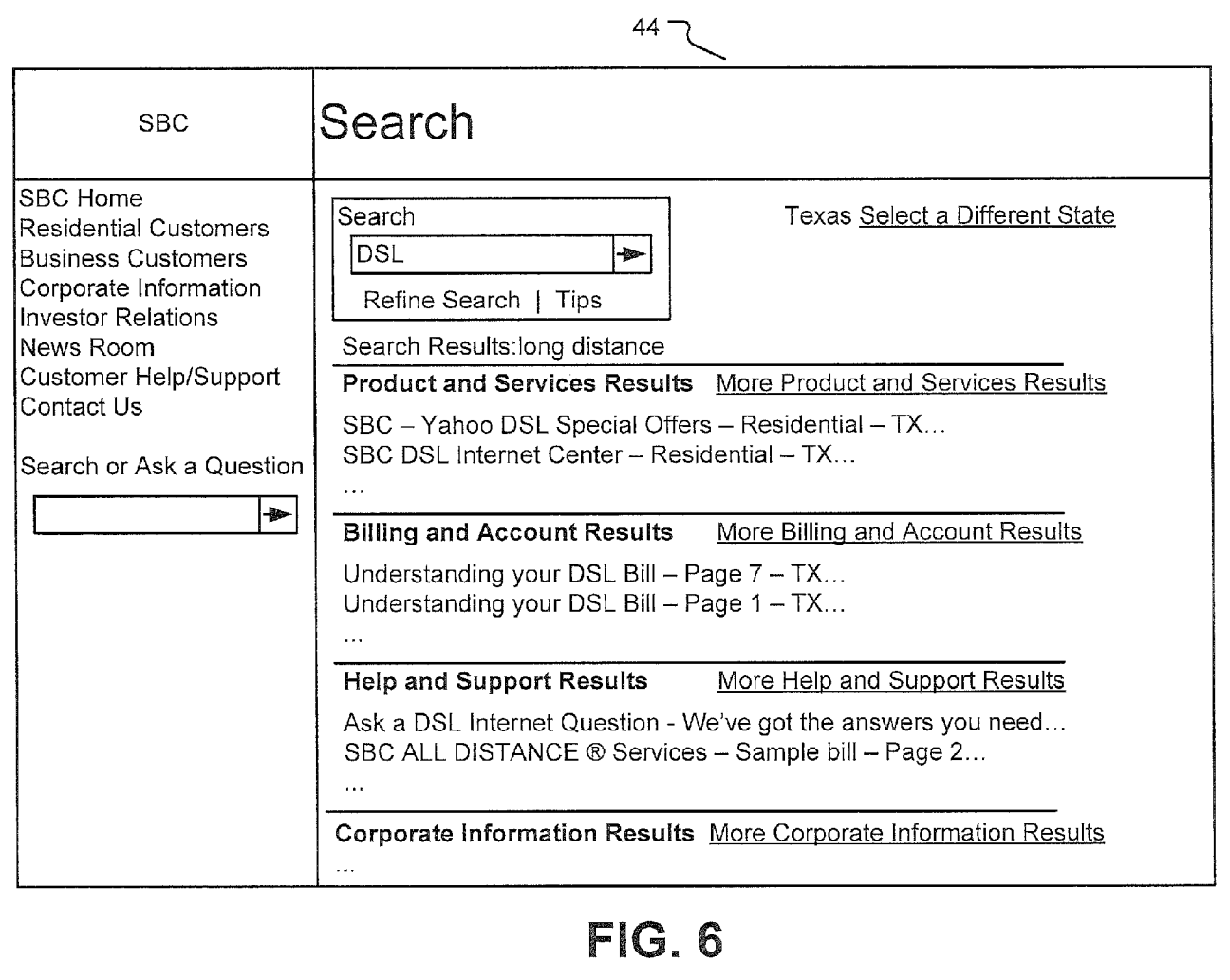

Some of the herein-disclosed features may be applied to provide a search results user interface that does not combine keyword search results and FAQ search results. For example, FIG. 6 is a screen shot of a display page 44" that is an embodiment of the display page 44 in FIG. 2 that includes keyword search results but not FAQ search results. For a search query of "DSL", the display page 44" provides DSL-related search results categorized into products and services results, billing and account results, help and support results and corporate information results. Links to the top three DSL-related results for each category are displayed, as well as links to get more results from any category. If a user wants to view more results for a section, he/she is taken to a subsequent results page with ten results per page. The subsequent results page enables the user to modify the category that he/she wishes to view in detail at any time using a drop-down menu at or near the top of the page.

FIG. 7 is a screen shot of an example of a detailed search results page 96 that includes a drop-down menu 98 for modifying the category. For purposes of illustration and example, the page 96 is generated for a user-entered search query of "call forwarding" and for a user selection of the help and customer support category. The drop-down menu 98 enables the user to jump from the page 96 directly to either a second detailed page dedicated to call-forwarding-related search results in the products and services category, a third detailed page dedicated to call-forwarding-related search results in the billing and account category, or a fourth detailed page dedicated to call-forwarding-related search results in the corporate information category. This feature distinguishes over existing search engines that require the user to go back to a main results page to select another category.

It will be apparent to those skilled in the art that the disclosed embodiments may be modified in numerous ways and may assume many embodiments other than the particular forms specifically set out and described herein.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, at a computer device, a search query for a particular application from an input field of a user interface;
   performing a keyword search at the computer device based on the search query to generate keyword search results;
   performing a natural language search of a frequently-asked question database at the computer device based on the search query to generate frequently-asked question search results; and
   outputting a display page from the computer device, wherein the display page categorizes the keyword search results and the frequently-asked question search results into a plurality of categories, wherein each category of the display page is associated with a first display region and a second display region that is separate from the first display region, wherein the first display region of a particular category includes one or more keyword search results associated with the particular category and does not include any of the frequently-asked question search results, and wherein the second display region associated with the particular category includes one or more frequently-asked question search results associated with the particular category and does not include any of the keyword search results;

wherein the plurality of categories are based on group assignments and name assignments; and wherein the group assignments and the name assignments are determined using a card sort method.

2. The method of claim 1, wherein the group assignments and the name assignments are validated via a reverse card sort method.

3. The method of claim 2, wherein the group assignments and the name assignments are performed by a first set of individuals.

4. The method of claim 3, wherein the reverse card sort method is performed by a second set of individuals.

5. The method of claim 1, wherein an order of the categories shown in the display page is a fixed order.

6. The method of claim 1, wherein an order of the categories shown in the display page is variable based on how well results in each category match the search query.

7. The method of claim 1, wherein the display page includes a second user interface that enables refinement of the search query.

8. The method of claim 1, wherein the display page includes a user-selectable option to output a second display page that displays additional keyword search results and additional frequently-asked question search results.

9. The method of claim 8, wherein the keyword search results of the second display page are displayed in a first column and the frequently-asked question search results of the second display page are displayed in a second column.

10. The method of claim 1, wherein the first display region associated with the particular category is a first column and wherein the second display region associated with the particular category is a second column adjacent to the first column.

11. The method of claim 10, wherein a keyword search result of the one or more keyword search results associated with the particular category that best matches the search query is in a first row of the first column.

12. A computer-readable storage device comprising instructions that, when executed by a processor, cause the processor to perform operations comprising:

receiving a search query for a particular application from an input field of a user interface;

performing a keyword search based on the search query to generate keyword search results;

performing a natural language search of a frequently-asked question database based on the search query to generate frequently-asked question search results; and outputting a display page, wherein the display page categorizes the keyword search results and the frequently-asked question search results into a plurality of categories, wherein each category is associated with a category title, a first display region, and a second display region that is separate from the first display region, wherein the second display region of a particular category includes one or more frequently-asked question search results associated with the particular category and does not include any of the keyword search results for the particular category;

wherein a statistical cluster analysis is performed to determine the plurality of categories for a particular application based on group assignments and name assignments.

13. The computer-readable storage device of claim 12, wherein a card sort method is used to perform the group assignments and the name assignments.

14. The computer-readable storage device of claim 13, wherein the group assignments performed by a first set of individuals is validated via a reverse card sort method.

15. The computer-readable storage device of claim 13, wherein the operations further comprise:

determining a first category that best matches the search query and a second category; and displaying information associated with the first category in a row separate from information associated with the second category.

16. A system, comprising:

a processor; and a memory including computer program code executable by the processor to:

receive a search query from an input field of a user interface;

perform a keyword search based on the search query to generate keyword search results;

perform a natural language search of a frequently-asked question database based on the search query to generate frequently-asked question search results; and output a display page, wherein the display page categorizes the keyword search results and the frequently-asked question search results into a plurality of categories, and wherein the display page includes:

a first region including a first listing of one or more of the keyword search results associated with a category, wherein the first listing does not include any of the frequently-asked question search results; and a second region including a second listing of one or more of the frequently-asked question search results associated with the category, wherein the second listing does not include any of the keyword search results;

wherein a statistical cluster analysis is performed to determine the plurality of categories based on group assignments and name assignments.

17. The system of claim 16, wherein a card sort method is used to perform the group assignments and the name assignments.

18. The system of claim 17, wherein the group assignments performed by a first set of individuals is validated via a reverse card sort method.

19. The system of claim 16, wherein the memory includes computer program code executable by the processor to output a second display page that displays additional keyword search results and additional frequently-asked question search results in response to selection of a user-selectable option.

20. The system of claim 19, wherein a frequently-asked question search result associated with a particular category is shown in a first row of the second column associated with the particular category when the frequently-asked question search result best matches the search query compared to other frequently-asked question search results associated with the particular category.

* * * * *